April 12, 1966  W. M. CHARDACK  3,245,406
SURGICAL TAPE
Filed Sept. 10, 1962
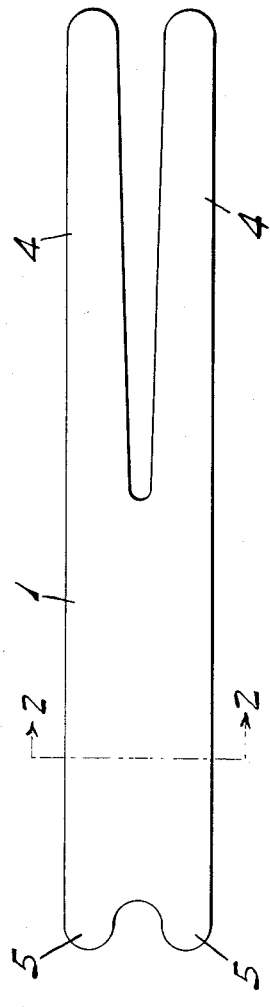
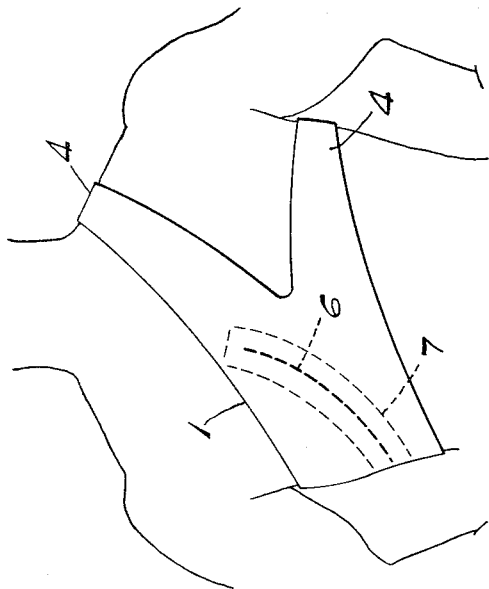
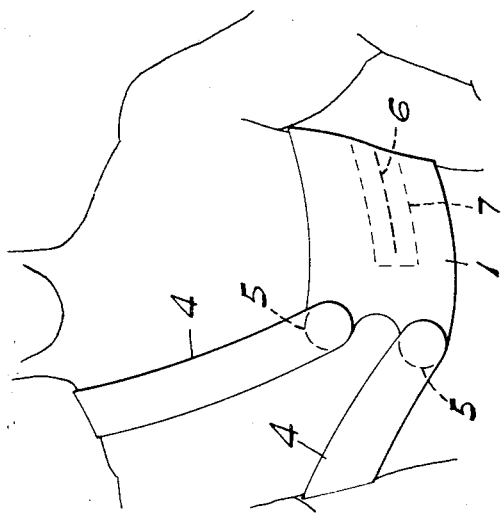
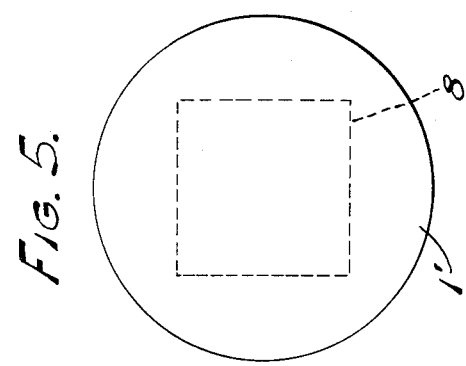
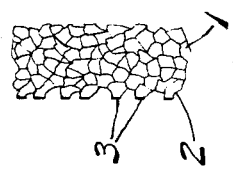
INVENTOR.
WILLIAM M. CHARDACK
BY
Christel + Bean
ATTORNEYS

United States Patent Office 3,245,406
Patented Apr. 12, 1966

3,245,406
SURGICAL TAPE
William M. Chardack, 144 Ivyhurst Road, Buffalo, N.Y.
Filed Sept. 10, 1962, Ser. No. 222,500
9 Claims. (Cl. 128—156)

This invention relates generally to the medical art, and more particularly to a new and useful surgical adhesive tape.

The adhesive tapes customarily used to hold surgical dressings in place are not entirely satisfactory. For example, although flexible and therefore capable of a degree of conformance to a body surface when first applied, they do not accommodate movement of such body surface. If applied over a joint, movement of the body member at the joint causes the tape to pull away from the body surface, unless the tape is applied so tightly as to restrict such movement. If applied to a body portion capable of expansion and contraction, such as the chest and adjoining abdominal area, the tape, if circular or even only partially circular, resists such expansion movement and thereby interferes with respiration. Since such tapes usually are first applied with the patient still under anesthesia, with a body position and contour different from that obtaining when awake, this lack of elasticity is unsatisfactory.

Furthermore, such tapes are in continuous adhesive contact with the skin over the entire area of the tape. Even in the case of presently available perforated tapes, the adhesive mass covers a substantial area, and although it may be porous it is not truly discontinuous because each area of adhesive is adhesively connected to the adjacent adhesive areas. This often makes separation of the tape from the skin an uncomfortable and painful process. When a dressing must be changed frequently, as often is the case, the repeated removal of the tape can be a source of much discomfort. When substantial areas of skin are covered by adhesive, evaporation of perspiration moisture is impeded, and this causes the taped skin area to become macerated and also may contribute to infection of the wound.

In addition, many such tapes are not washable, and keeping them clean and dry is a problem.

Tapes of a stretchable fabric are available, but they, too, have a continuous adhesive layer and offer the disadvantages presented thereby. In addition, such tapes have only limited yieldability, and are apt to unravel when stretched too much.

Accordingly, the primary object of my invention is to provide a surgical adhesive tape which conforms to a body surface, and to expansion, contraction and flexing thereof, and which can be removed therefrom without discomfort.

Another object of my invention is to provide the foregoing in a tape which is extremely light weight, non-irritating, readily washable without adverse effect on its desirable adhesive and conforming properties, and which can be either pervious or impervious, depending upon its intended use.

In one aspect thereof, a surgical tape constructed in accordance with my invention is characterized by the provision of a sheet of resiliently yieldable, cellular material having a rough surface, and a discontinuous layer of adhesive material carried by that surface of the sheet, the adhesive providing substantially only point fixation of the tape to a body surface.

The foregoing and other objects, advantages and characterizing features of a surgical tape constructed in accordance with my invention will become clearly apparent from the ensuing detailed description of certain illustrative embodiments thereof, taken in conjunction with the accompanying drawing illustrating the same wherein like reference numerals denote like parts throughout the various views and wherein:

FIG. 1 is a top plan view of one form of surgical tape of my invention;

FIG. 2 is a transverse section view thereof, taken about on line 2—2 of FIG. 1, and also representing a longitudinal sectional view thereof taken at right angles to the line 2—2 of FIG. 1;

FIG. 3 is a front elevational view of the upper trunk of a man, showing the tape of FIG. 1 applied as a circular tape over a wound dressing thereon;

FIG. 4 is a rear elevational view thereof; and

FIG. 5 is a top plan view of another form of surgical tape of my invention, comprising part of a complete surgical dressing.

The surgical tape of my invention, in its basic form, comprises a sheet 1 of resiliently yieldable, cellular material having a rough surface 2, to which there is applied a discontinuous surface of adhesive material 3. The material of sheet 1, in addition to being resiliently yieldable and cellular, should be inert and non-irritating to the skin. For comfort, it must be light in weight, and it should be sufficiently elastic so that when applied as a circular tape it will not restrict either circulation or dimensional changes in the taped part.

Synthetic sponge materials of the type comprising a foamed mass of plastic and interconnected fibers are eminently suitable for use in sheet 1. They are light weight, and therefore comfortable. They are resiliently yieldable, and readily conform to a body surface, while being possessed of great tensile strength making it possible to use extremely thin sheets, down to 0.5 mm. in thickness, for maximum comfort and convenience. Also, their cellular construction provides them with a rough and discontinuous surface for receiving the adhesive 3.

The cellular structure of synthetic sponge material lightens the weight of the sheet. In an open-cell construction, it makes the sheet pervious, and the pervious sheet comprises a filter of increasing effectiveness with decreasing pore size. Equally if not more important for purposes of my invention, however, is the fact that such cellular structure provides a surface 2 which is rough, having ridges and projections formed by the interconnected, extending fibers of which such material is constructed. I utilize this naturally rough and discontinuous surface formation as the base for my adhesive 3.

It is essential to my invention that the adhesive coating 3, instead of comprising a continuous film completely across the surface of sheet 1, be discontinuous in nature, with the adhesive applied only to the projecting extremities which comprise the discontinuous surface 2. The rough surface 2 of sheet 1 greatly facilitates the provision of such an adhesive surface.

For example, the adhesive layer 3 can be applied by lightly contacting the surface 2 of material 1 with a film of adhesive material, whereby only the projections on surface 2 have sufficient contact with the adhesive material to retain the same. In this way, only the projecting ends of the fibers are coated with adhesive, and the adhesive material is thereby provided in discontinuous spots or points across the material. The adhesive 3 can of course be applied by other techniques, so long as they result in a discontinuous adhesive layer, as distinguished from a film of adhesive.

The discontinuity of the adhesive layer insures that the adhesive does not impair the conforming ability of the sheet 1. The synthetic sponge material comprising sheet 1 is resiliently yieldable in nature, whereby it can expand and contract with expansion and contraction of a body surface, such as the chest wall. Thus, a circular taping of the body now becomes truly feasible. Also, if applied over the joint of a movable member such as a finger, it will yield and conform as the finger is flexed. Because the adhesive layer 3 comprises only disconnected points or islands of adhesive, it does not interfere with this desirable ability of the sponge material to conform.

Looking at FIG. 2, it will be appreciated that conformance of sheet 1 between any two points of adhesive 3 will be determined only by the conforming ability of the sponge material itself. It will not be restricted or impaired by the adhesive material, because adjacent adhesive points are adhesively disconnected and therefore free to move toward and away from each other, governed only by the sponge material of sheet 1. In other words, sheet 1 is fixed to the skin only at spaced points, comprising the adhesive islands 3, and movement of these points relative to each other, with expansion, contraction and flexing of the skin surface, is governed only by the resiliently yieldable sponge material connecting these points.

This is in sharp contrast with the situation which would prevail if the adhesive areas 3 were connected by adhesive, to comprise a continuous layer or film of adhesive as in ordinary tapes. In such case, the connected adhesive areas 3 could move relative to each other only as permitted by the connecting adhesive material. The adhesive film then would interfere with the desired conformance of the tape by the resiliently yieldable nature of the sponge material.

This would be true, even though the continuous adhesive layer were perforated, because all parts of the adhesive still would be interconnected. It has been proposed, for example, to provide a bandage comprising a foam latex material having a porous application of adhesive to one surface of the bandage. Although such adhesive layer might be porous, it would be continuous, and the yieldable connection provided by the foam latex would be modified and impaired by the connecting adhesive material. This would not provide the desired characteristics of my tape with its discontinuous layer of adhesive, wherein the adhesive areas are minute and connected only by the sponge material 1.

This critical distinction between the continuous film of adhesive provided by conventional tapes and the discontinuous adhesive surface of the tape of my invention can be illustrated by reference to a paper tape having numerous spaced perforations therethrough. The conventional adhesive surface, like the paper tape, is continuous and interconnected throughout, although perforated. My adhesive surface, like the perforations, is discontinuous, comprising discrete points or islands.

Also, synthetic sponge materials, such as those formulated from polyurethane polyether, are much to be preferred to a foamed latex material. The former are materially lighter in weight, comprising a much higher percentage of air, and are so much less likely to be irritating to the skin surface as to be considered inert, by comparison. Also, while extremely elastic, they have much greater tensile strength and can be made in much thinner sheets. A particularly desirable material is a polyurethane sponge known as "Scott Industrial Foam," made by Scott Paper Company, in which the cell walls are dissolved away leaving only the interconnected fibers. The resiliently yieldable sponge construction is retained, in a material still lighter in weight and having the rough, discontinuous surface desired for application of a discontinuous coating of adhesive.

Other synthetic sponge materials, including for instance polyethylene, polyvinyl chloride and foamed ethylene propylene copolymer sponge, can be utilized in sheet 1. Any suitable adhesive, inert to tissue, compatible with sheet 1, and preferably of the pressure sensitive type, can be used. For example, polyvinyl acetate, polybutyl acrylate, polybutylene, plasticized if necessary, can be used.

In addition to retaining the desirable conforming properties of the resiliently yieldable sponge material, the point fixation provided by the discontinuous adhesive layer 3 materially reduces the discomfort attendant upon removal of the tape, to the point where this no longer presents a problem. This occurs, not only because there is much less total area of adhesive in contact with the skin, but also because the absence of connecting adhesive permits separation point by point instead of on a continuous basis.

The sponge material of sheet 1 can be open cell, where porosity is desired, or closed cell where drainage from the wound presents a problem. In an open cell construction, the adhesive layer 3 presents no interference with the desired perviousness, because of its discontinuous nature.

The tape of my invention also has the advantage that it can be wetted and washed, and will remain applied to the body in conformance thereto. Thus, the tape need not be replaced merely because of external soil, or because it has been inadvertently wetted.

In the tape of FIGS. 1–4, the sheet 1 is formed at one end to provide a pair of elongated straps 4, and at its opposite end to provide a pair of anchoring portions 5. The entire under surface of sheet 1 is provided with a discontinuous layer of adhesive 3, as indicated in FIG. 2, and similar discontinuous applications of adhesive are made on the upper surface of portions 5.

This construction is particularly useful where a circular tape is desired, as with a chest wound, indicated at 6 in FIGS. 1 and 2. The wound is covered with a suitable dressing 7, which can be completely separate from the tape 1, and the tape then is applied over the dressing in the manner shown. In doing this, the main body of the tape is placed over the dressing 7, and the straps 4 extend around the chest wall and over a shoulder to assist in maintaining the bandage in place. Straps 4 extend across the front chest wall into overlapping, anchoring adhesive engagement with the portions 5.

Thus, the sheet 1 has point fixation to the body, completely around the dressing. This point fixation permits the resiliently yieldable material of sheet 1 to expand, contract, and otherwise move with the body thereby conforming to the body at all times, without interference. Even though the tape is applied as a circular tape, extending completely around the body, it does not restrict or in any way interfere with respiration. Thus, with my invention it is possible to provide a convenient and comfortable circular bandage. When it is desired to change the dressing, the tape is readily removed with little or no discomfort because of the point application of adhesive.

FIG. 5 shows another form of tape of my invention, in which sheet 1' is a slab of the same material as sheet 1 in the embodiment of FIGS. 1–4, with the same discontinuous adhesive layer 3 on its entire underside. As illustrated in this instance, the tape can be provided with an absorbent dressing material 8, of any desired type, and thereby made part of a pre-formed surgical dressing. The dressing 8 can be held against sheet 1 by the adhesive 3.

Obviously, the tape of my invention can be provided in any form and size, the foregoing examples being merely by way of illustration.

It will be seen that by providing a simple sheet of sponge material, the same is resiliently yieldable in all directions without restriction. Inasmuch as the resiliently yieldable attribute of the sponge material is used for conformance, and not for application of pressure which is only incidental, the sheets 1 and 1' are free of reinforcing elements foreign to the sponge material, which elements would merely add to the weight and cost of the tape and might interfere with its conforming ability. The tensile strength of the synthetic sponge material itself is such that the desired expansion can be acommodated, even in an extremely thin sheet, without added reinforcement.

I have used tapes of my invention, in various forms, with excellent results. In one test, a strip of polyurethane sponge material approximately one-sixteenth inch thick, corresponding to sheet 1 and having a compatible pressure sensitive adhesive applied to one surface in a discontinuous layer 3, was wrapped around a finger, across a knuckle, with the material over-lapping on itself. The finger then was flexed and bent, at the knuckle. The tape conformed to the finger as it was flexed, without separation or other adverse effect. The tape was wetted, without impairment, and dried quickly. It did not interfere with freedom of movement of the finger, and it was readily stripped away with no discomfort whatever.

In another test, a larger tape of the same material, approximately three-sixteenths inch thick, was applied as a circular tape completely around the trunk. The tape conformed readily to the trunk, and to expansion, contraction and other movements thereof, without separation or restriction. It was readily removed with no discomfort.

Accordingly, it is seen that my invention fully accomplishes its intended objects, and provides a tape which may be applied in a circular manner when that is desired. While I have described in detail only two, illustrative embodiments thereof, that has been done by way of illustration only and without thought of limitation.

Having fully disclosed and completely described my invention, and its mode of operation, what I claim as new is:

1. A surgical tape comprising a sheet of resiliently yieldable cellular material having interconnected fibers forming ridges and projections providing a discontinuous surface on one face thereof, and a similarly discontinuous surface of pressure sensitive adhesive material on said face, said adhesive material being applied substantially only to the projecting extremities of said sheet material surface, thereby providing an adhesive surface which is discontinuous in all directions across said sheet, said tape thereby having substantially only multiple spaced point contact when said face is applied against a body surface.

2. A surgical tape as set forth in claim 1, wherein said sheet material comprises an open cell porous structure.

3. A surgical tape as set forth in claim 1, wherein said sheet is formed of closed cell material.

4. A surgical tape as set forth in claim 1, wherein said sheet comprises an elongated strip of material.

5. A surgical tape as set forth in claim 4, wherein said strip is formed at one end to provide a pair of straps.

6. A surgical tape as set forth in claim 4, wherein said adhesive layer is applied over said one surface of said sheet, and the opposite surface of said sheet is provided with a discontinuous adhesive layer at one end thereof.

7. A surgical tape as set forth in claim 1, wherein said sheet comprises a generally circular piece of material.

8. A surgical tape as set forth in claim 1, wherein said material comprises a synthetic sponge.

9. A surgical tape comprising a sheet of resiliently yieldable lightweight cellular material having interconnected fibers forming ridges and projections providing a discontinuous surface on one face thereof, said material being non-irritating to human skin, and a discontinuous surface of adhesive on said face, said adhesive being applied substantially only to the projecting extremities of said sheet material surface, and said adhesive surface extending completely across said face in all directions and being discontinuous in all directions across said sheet, thereby providing substantially only point fixation of said tape to a body surface.

References Cited by the Examiner

UNITED STATES PATENTS

| | | | |
|---|---|---|---|
| 2,292,024 | 8/1942 | Dreher | 128—153 X |
| 2,740,402 | 4/1956 | Scholl | 128—156 |
| 2,981,360 | 4/1961 | Fritze et al. | 181—33 |
| 3,036,571 | 5/1962 | Scholl | 128—153 |
| 3,039,893 | 6/1962 | Banigan et al. | 128—156 X |

FOREIGN PATENTS

| | | |
|---|---|---|
| 528,505 | 10/1940 | Great Britain. |
| 781,975 | 8/1957 | Great Britain. |

RICHARD A. GAUDET, *Primary Examiner.*

RICHARD J. HOFFMAN, *Examiner.*